United States Patent [19]

Lee

[11] Patent Number: 5,068,561
[45] Date of Patent: Nov. 26, 1991

[54] HOMOPOLAR ROTARY MACHINE WITH FLUX BYPASS

[76] Inventor: Woo S. Lee, 287, You Pyoung Li, Chung Cheong Puk Do, Rep. of Korea, 367-850

[21] Appl. No.: 466,650

[22] Filed: Jan. 17, 1990

[30] Foreign Application Priority Data

Jan. 23, 1989 [KR] Rep. of Korea .................. 89690[U]

[51] Int. Cl.$^5$ ...................... H02K 1/06; H02K 21/36; H02K 31/00
[52] U.S. Cl. ..................................... 310/178; 310/190
[58] Field of Search ................ 310/178, 190, 261, 266

[56] References Cited

U.S. PATENT DOCUMENTS

| | | | |
|---|---|---|---|
| 2,849,630 | 8/1958 | Waloff et al. | 310/190 |
| 3,521,899 | 7/1970 | Whitehead . | |
| 4,347,457 | 8/1982 | Sakamoto | 310/190 |
| 4,349,761 | 9/1982 | Aoki | 310/266 |
| 4,499,392 | 2/1985 | Giacoletto | 310/178 |
| 4,514,653 | 4/1985 | Batni | 310/178 |
| 4,858,304 | 8/1989 | Weldon et al. | 310/178 |

*Primary Examiner*—Steven L. Stephan
*Assistant Examiner*—D. L. Rebsch
*Attorney, Agent, or Firm*—Fleit, Jacobson, Cohn, Price, Holman & Stern

[57] ABSTRACT

A homopolar rotary dynamoelectrical machine used as motor or generator has a dense magnetic flux area and sparse magnetic flux area in the air gap between the confonting pole of the main field yoke, the sparse area being in a by-pass yoke which is positioned closely adjacent the side face of the confronting pole. Thus magnetic flux affecting the conductive member becomes diluted in the area of the by-pass yoke, and in the area where the by-pass yoke is not positioned, the magnetic flux affecting the conductive member is kept as it was. Accordingly, generation due to the difference in the amount of magnetic flux is possible.

4 Claims, 4 Drawing Sheets

HOMOPOLAR ROTARY MACHINE WITH FLUX BYPASS

BACKGROUND OF THE INVENTION

This invention relates, in general, to the field of homopolar rotary dynamoelectric machines in which the conductive members are connected directly and serially to each other and, in particular, to a homopolar rotary dynamoelectrical machine having a construction wherein the serially connected conductive members are designed to be positioned in the air gap between the faces of the confronting poles of the main field yoke in which the dense magnetic flux and rare magnetic flux areas are arranged on equal terms, thus allowing the homopolar rotary dynamoelectrical machine to generate a certain amount of current according to the total voltage produced on the conductive member.

In accordance with the principle of the homopolar generator it is generally known that the generating conductive member is arranged in the air gap between the faces of the homopolar confronting poles of the main field yoke, thus permitting the generating function to be possible.

However, in the above homopolar generator, it is generally impossible for the generating conductive members arranged in the cylindrical space between the above confronting poles to be connected directly and serially from the structural parts so that it must be arranged to generate the consecutive one way direction current by cutting the magnetic flux in the cylindrical space within the homopolar generator.

As an alterative to connecting the generating conductive members directly and serially with each other, numerous slip rings can be used as generally known.

However, the above conventional homopolar generator in the use of numerous slip rings is restricted by its use, its usefulness and its layout because not only the complete mechanical work to connect numerous slip rings to the respective rotatable conductive members becomes necessary, but also the numerous slip rings or the rotatable conductive members cannot be included effectively in the limited space within the homopolar generator.

And, furthermore, the increase of the mechanical abrasion or the disadvantages of operating and repairing the slip ring or like components causes all those prior art devices not to be easily fitted to the layout of the conventional homopolar generator, excepting the homopolar generator for particular use.

As above, in conventional technology, the homopolar generator is not satisfactory for its use and usefulness due to it not being possible for the rotatable conductive members to be connected directly and serially with each other, unavoidably arising from the structural particulars of the homopolar generator.

BRIEF SUMMARY OF THE INVENTION

The objective of this invention is to provide a homopolar generator formed with a dense magnetic flux area and a rare, or sparse magnetic flux area in the air gap between the confronting poles of the main field yoke, in order to solve the above problem.

Another objective of this invention is to provide a homopolar generator formed with a dense magnetic flux area and a sparse magnetic flux area in the air gap between the confronting poles of the main field yoke, so that a pure and uniform direct current not having a ripple component can be obtained from the conductive member. Due to the operation of the construction in this invention, the conductive members are connected serially to each other, and alternatively the device can be used as a direct current transformer by arranging the multiple independent conductive members between the confronting poles of the main field yoke, or otherwise can be usable as an electrical machine using the direct current interchangeably.

The present invention is, for attaining the above goal, characterized by being formed with a dense magnetic flux area and an equal sparse magnetic flux area in the air gap and provided an equal number of such areas arranged alternately in the air gap between the confronting poles of the magnetic field yoke facing each other, and wherein rotatable conductive members are connected serially with each other, or the rotatable magnetic field is designed to be positioned, respectively, parallel or radially.

BRIEF DESCRIPTION OF THE DRAWINGS

The novel features and advantages of this invention will be apparent from the detailed embodiment in the following description with reference to the accompanying drawings wherein:

FIG. 1b is a cross-sectional view taken along line $A_1$—$A_1$ of FIG. 1a;

FIG. 1c is a view similar to FIG. 1b taken along line $A_2$—$A_2$ of FIG. 1a;

DETAILED DESCRIPTION

Figure 1A:
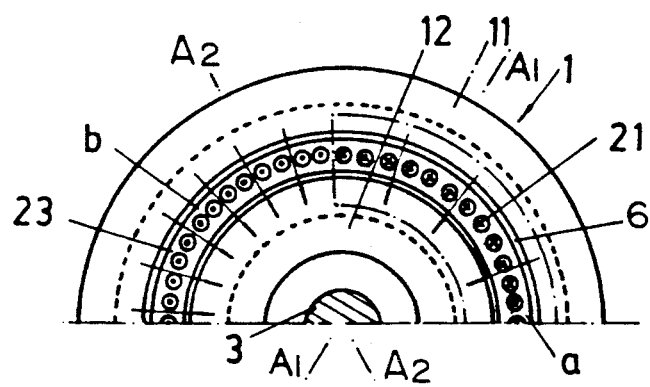
FIG. 1a is an elevational view which shows the basic construction of the homopolar rotary dynamoelectric machine of this invention.

FIG. 1a shows the basic construction of this invention, the homopolar rotary dynamoelectric machine having magnetic field yoke 1 ferromagnetic material by which the magnetic circuit (EC) is formed, the confronting poles 11, 12 being face to face with each other, the rotatable conductive member 21 positioned in the air gap G between the above-noted confronting poles 11, 12, and a by-pass yoke 22 of ferromagnetic material connecting the magnetic flux between the confronting poles 11, 12 of the main field yoke 1 positioned at one side of the air gap G formed by the confronting poles 11, 12. Bypass yoke 22 is mounted on the adhesion factor 23 of non-ferromagnetic material including the rotatable conductive member 21, thus forming the rotatable unit 2 connected directly to the rotatable rotor shaft 3. By-pass yoke 22 included in the above rotatable unit 2, at a position close to the outer side of the confronting poles, provides a by-pass magnetic circuit (ECb), or flux.

Figure 1B:
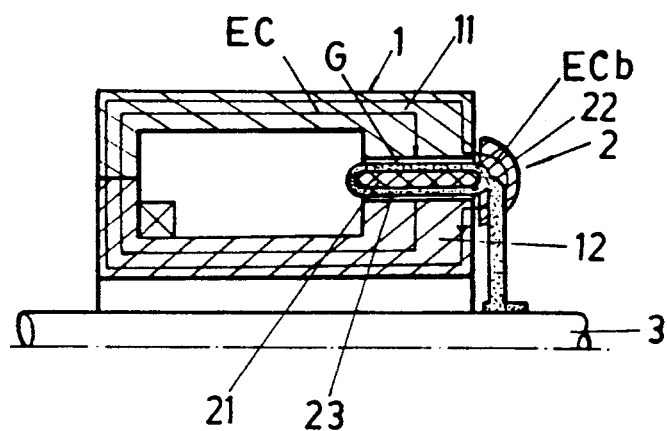

In the air gap G between the confronting poles 11, 12 the conductive member 21 constituted by the wire as shown in FIG. 1b extends from the sparse magnetic flux area (a), where the by-pass yoke is positioned, to the dense magnetic flux area (b) where the by-pass yoke is not positioned, or conversely, in the form of a serial connection. On the other hand, FIGS. 2a, b shows another practical example of the basic construction of this invention shown in FIG. 1.

Figure 1C:
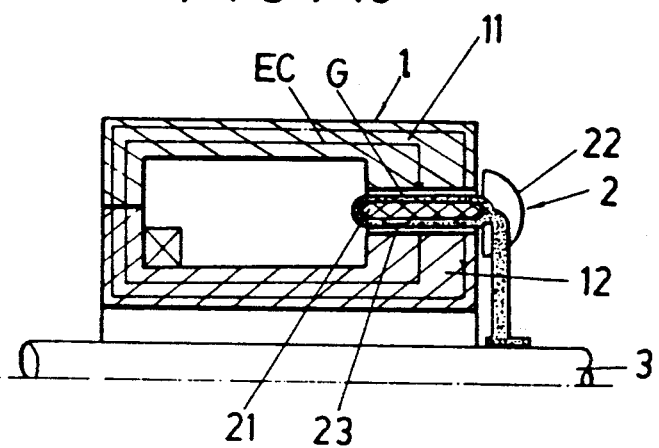

Here, FIG. 2 is different from the FIG. 1 only in the fact that the magnetic flux by-pass yokes 22a, 22b are formed symmetrically on both side faces of the confronting poles 11, 12 of the magnetic field yoke 1.

Figure 2A:
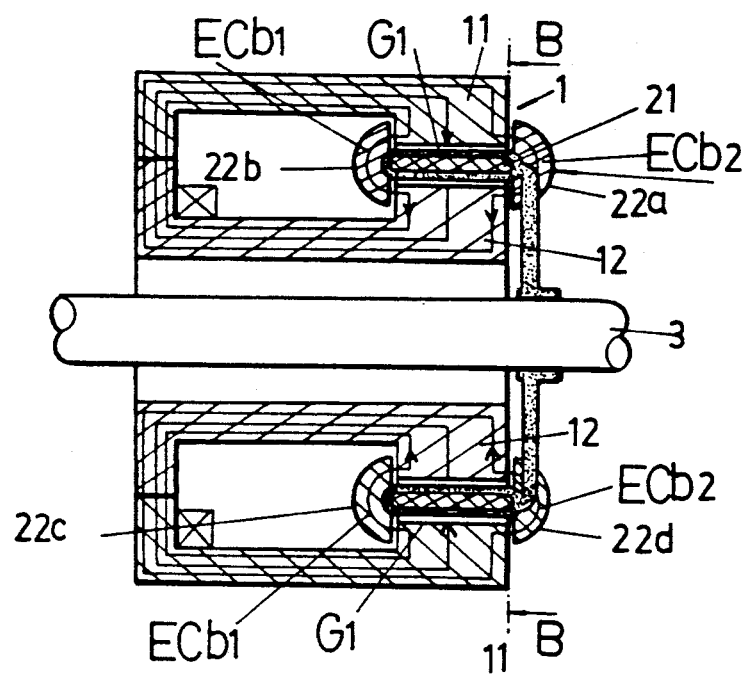
FIG. 2a is a cross-sectional view of another embodiment of the basic construction shown in FIG. 1.
Figure 2B:
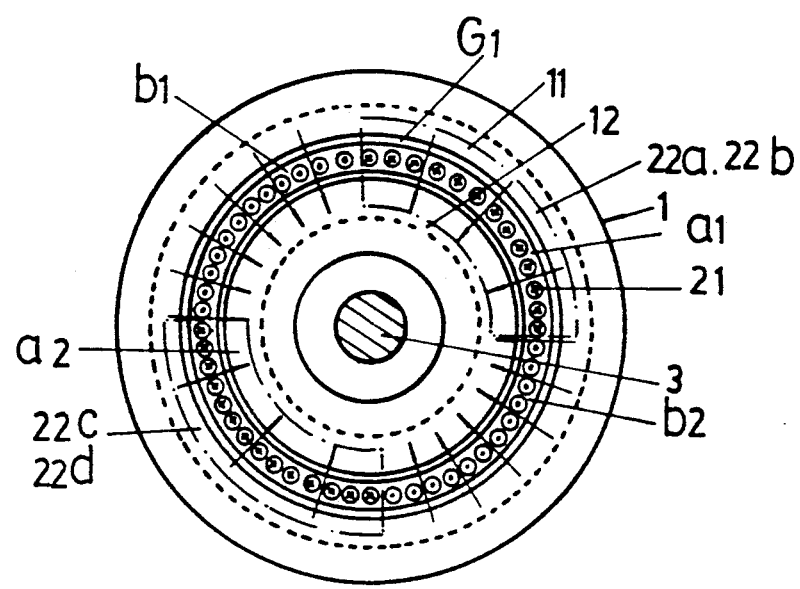
FIG. 2b is an elevational view of the FIG. 2a embodiment taken along line B—B thereof.

As shown in FIG. 2b, the magnetic by-pass yokes 22a, 22b are formed symmetrically and diagonally about the rotatable rotor shaft 3 whereby the sparse magnetic flux areas $a_1$, $a_2$ are formed, and the dense magnetic flux areas $b_1$, $b_2$ where the above magnetic flux by-pass yoke do not exist are arranged at a cross, or alternate diagonal, position with the sparse magnetic flux areas $a_1$, $a_2$.

Figure 4:
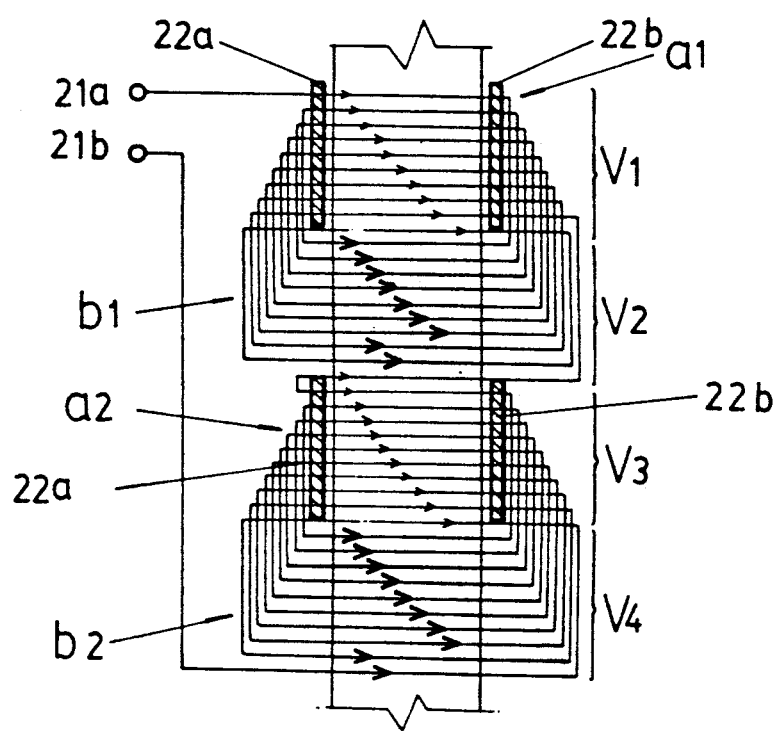
FIG. 4 shows a chart illustrating the winding mode of the generating conductive members connected serially.

The rotatable conductive member, as FIG. 4 shows, is the wire starting from the sparse magnetic flux area ($a_1$), in consecutive order and by the same intervals passing through the dense magnetic flux area ($b_1$), and thereafter repeatedly wound conversely in a series connection.

Figure 3A:
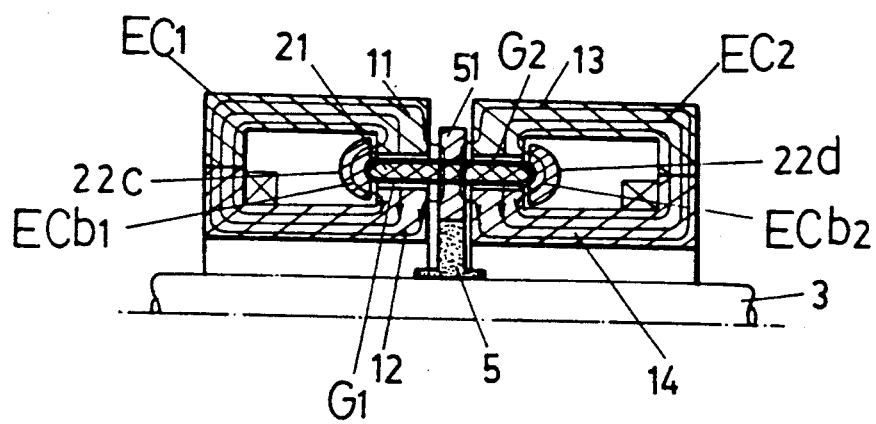
FIG. 3a is a view similar to FIG. 1b which shows the homopolar rotary dynamoelectric machine having two cylindrical main field yokes installed on both sides of the adhesion factor as a center mounted on the rotatable rotor shaft.

FIG. 3a shows another embodiment of this invention wherein double by-pass yokes are respectively formed on both sides of two cylindrical magnetic main field yokes and are mounted on the rotatable rotor shaft 3. The by-pass yokes positioned near the faces of the two pairs of confronting poles 11, 12 and 13, 14 of the cylindrical main field yokes and include common by-pass yoke 51. Rotatable conductive members 21 are positioned in the air gaps $G_1$, $G_2$ between the pairs of confronting poles of both cylindrical main field yokes and are adhered on the rotatable unit 2.

Figure 3B:
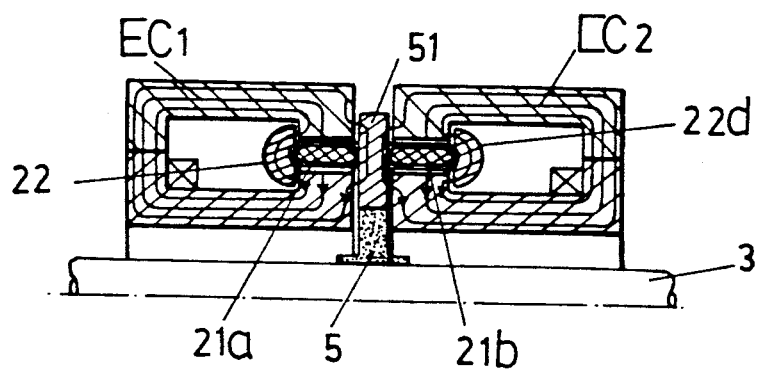
FIG. 3b is a view similar to FIG. 3a which shows another embodiment.

Here, it is, of course, possible to form only common by-pass yoke 51 between both cylindrical main field yokes without the by-pass yoke 22a, 22b, 22c, 22d. FIG. 3b shows another example of this invention as shown in FIG. 3a but which has a different construction from FIG. 3a in that the rotatable conductive member 21 included on the adhesion member 5 consists of independent 1st 21a and 2nd 21b conductive members.

Figure 3C:
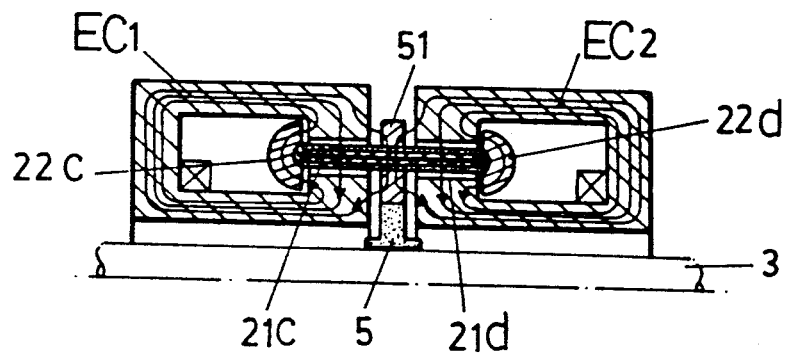
FIG. 3c shows still another embodiment.

FIG. 3c shows the formation of the conductive member 21 in which multiple conductive members 21c, 21d are included independently, such as the conductive members in the air gaps, G, $G_1$, $G_2$ shown in FIG. 1a, FIG. 2a and FIGS. 3a, b.

Figure 5:
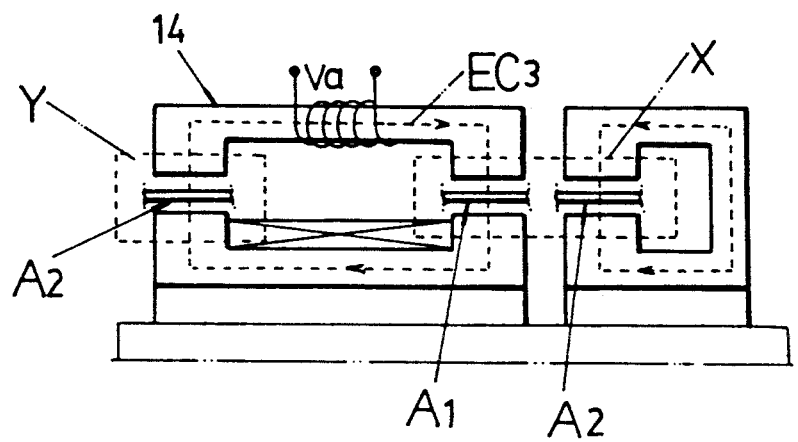
FIG. 5 shows still another embodiment of this invention.

FIG. 5 shows a homopolar rotary dynamoelectrical machine having numerous confronting poles in the magnetic circuit provided by main field yoke 14, and herein the various kinds of rotatable conductive member unit are alternatively arranged.

In this example shown in FIG. 5, the homopolar rotary dynamoelectric machine may be constituted on the positions of both X and Y. Assuming that the homopolar rotary dynamoelectrical machine of this invention is A1 and the multipurpose homopolar electrical machine having the ability to generate alternating current is A2, then A1 and A2 are alternatively designed to be installed on the position X or Y.

On the other hand, where the above homopolar rotary machine has a function of alternating from dc to ac or conversely, the circuit device for offsetting the fluctuation of the 1st or 2nd voltage is provided the reactor means on the 1st or 2nd input terminal and output terminal. Here, the signal Va is explained below to point out the excited wound coil power supply unit.

The preferred embodiment of this invention, its operation and effect will be apparent from the following description.

First of all, as FIG. 1a shows, in the area (a) where the by-pass yoke 22 is positioned, some amount of the magnetic flux by the main field yoke 1 passes through the by-pass yoke 22 positioned near the side face of the confronting poles 11, 12 whereby the magnetic flux effecting the generating conductive member 21 in the airgap G between the confronting poles becomes reduced sparse flux area.

In contrast, in the area where the above by-pass yoke 22 is not positioned at the side of the confronting pole 11, 12, the magnetic flux between the confronting poles 11, 12 more strongly effects the conductive member 21, accordingly forming the more dense magnetic flux area (b).

FIG. 2a shows the formation of the bypass yokes 22a, 22b being installed on both sides of the confronting poles 11, 12, thus forming the two-way by pass magnetic circuit (ECb$_1$, ECb$_2$), whereby the magnetic flux effecting the generating conductive member 21 between the confronting poles becomes more reduced, possibly because the double by-pass yokes 22a, 22b doubles the amount of the magnetic flux passing through the yokes.

The conductive member 21 arranged between the dense magnetic flux area and the sparse magnetic flux area is positioned intercrosslly as the serial connection shown in the FIG. 4, wherein the dense magnetic flux area $b_1$, $b_2$ and the sparse magnetic area $a_1$, $a_2$ is symmetrically and diagonally formed about the rotatable rotor shaft as the center.

Hence, when assuming that the generating voltage drawn out from the above sparse magnetic flux areas $a_1$, $a_2$ are respectively V1, V3 and the generating voltage drawn out from the above dense magnetic flux areas $b_1$, $b_2$ are respectively V2, V4, the total voltage drawn out from the dense magnetic flux areas $b_1$, $b_2$, exceeds that of areas $a_1$, $a_2$, so that the total voltage VT from the start terminal to the finish terminal is expressed as $$VT - V2 + V4 - V1 - V3.$$

To further explain the invention, FIG. 4 shows schematically a circuit or winding mode of the generating conductive members connected serially. The larger arrowheads indicate the relatively higher output, or voltage V2, V4, in the dense magnetic flux areas $b_1$, $b_2$, respectively, and the smaller arrowheads indicate the relatively low output or voltage V1, V3, in the rare magnetic flux areas $a_1$, $a_2$. Since the relatively higher output from the dense magnetic flux areas exceeds that from the rare magnetic flux areas, the difference between the outputs is the resultant, or total, output VT of the generator as indicated in the above equation. Of course, the rare magnetic flux areas are disposed in the areas of the by-pass yoke, and the dense magnetic flux areas are disposed where there is no by-pass yoke.

By maximizing the magnetic flux passing through the by-pass yoke where the sparse magnetic flux areas $a_1$, $a_2$ are formed, we can obtain direct current having high level output voltage, and furthermore, adjust the level of the output voltage by controlling the rotating speed of the conductive member 21.

FIG. 3a shows the formation of the common by-pass yoke 51 including the two conductive members 21 formed between the two cylindrical main field yokes allowing the effect of keeping high operational stability.

In the construction of FIG. 3b the respective 1st and 2nd rotatable conductive members 21a, 21b are included independently in the one rotatable conductive member, and output voltage level from 1st and 2nd rotatable conductive members 21a, 21b may be drawn out as the same kind or different form simultaneously. By providing one rotatable conductive member with electricity, a certain amount of direct current can be drawn out from another rotatable conductive member, in other words, as an alternative apparatus by means of the rotatable unit 2 being used as a motor.

Moreover, one conductive member can be provided as a motor, and the other conductive member as the voltage output, or conversely. We can, of course, expect the same operation as in FIG. 3b by providing the independent two rotatable conductive members 21c, 21d arranged in two magnetic circuits shown in FIG. 3c, or by applying independent multiple rotatable conductive members such as shown in FIG. 1, FIG. 2 and FIG. 3, on the rotatable rotor shaft shown in these figures.

On the other hand, as FIG. 5 shows, we expect the same operation by providing the homopolar rotary machine to have the confronting poles either X or Y alternatively of the main field yoke 14 constituting the main magnetic circuit, or, by providing the homopolar rotary machine to the region of X and the homopolar rotary machine having the ability to generate alternating current to the region of Y, the rotatable rotor can be used as the motor and the A2 can be used as the direct current generator through applying the power supply to the A1.

The arrangement of A1 or A2 in contrast to the above construction can be possible, and in case that A2 is used as the motor, A1 is operated as the alternating current output machine for collecting the alternating current.

Therefore, we can obtain by this invention various operations such as dc motor, ac motor, and transformer from dc to ac, or conversely simultaneously, or alternatively.

And, although the principle example shown in FIG. 1, FIG. 3 and FIG. 5 shows the formation of the conductive member of a rotating type, it will be observed that numerous modifications and variations such as magnetic field rotating types or radially attached conductive members against the shaft can be effected without departing from the true spirit and scope of the novel concept of the present invention.

In conventional homopolar generators having the cylindrical iron core as the generating conductive member, it's impossible to apply the principle of this invention to the homopolar generator having the cylindrical iron core.

Accordingly, when using the above cylindrical iron core as a generating conductive member, by substituting non-magnetic substance for the area where the above by-pass yoke is positioned and substituting the magnetic substance for the area where a by-pass yoke is not positioned, we can obtain the same operation shown above by the by-pass yoke.

And, in order to make the homopolar rotary dynamoelectrical machine more effectively, the conductive member can be substituted by the factor having relatively low magnetic flux permeation rate in the area corresponding to the dense magnetic flux area, and the factor having relatively high magnetic flux permeation rate in the area corresponding to the sparse magnetic flux area. Speaking of the advantage and the inventive step of this invention, it will guarantee the effective function of creating D.C. or A.C. effectively by means of the construction where both the dense magnetic flux and sparse magnetic flux areas are designed to be installed, and the conductive members connected serially to each other, are positioned between the confronting poles of the main field yoke.

I claim:

1. A homopolar rotary dynamoelectric machine comprising:
a hollow, annular cylindrically shaped magnetic field yoke of ferromagnetic material for conducting magnetic flux therethrough in a toroidal loop circuit around the hollow annulus in the annular yoke;
an annular slot through one end portion of the cylinder extending substantially parallel to the central axis of the cylinder to form an annular air gap through said flux loop at said one end portion and two opposed pole faces forming opposite sides of said gap;
an annular conductive member in said gap in substantially equally spaced relation to said opposed pole faces and supported for relative rotation with respect to said magnetic field yoke so that said conductive member passes transversely through magnetic flux in said gap; and
a plurality of substantially equally circumferentially spaced magnetic flux by-pass yokes of ferromagnetic material in adjacent closely spaced relation to at least one end of said gap for conducting at least a part of said magnetic flux so that said part of said flux by-passes around said gap reducing said flux passing through said gap thereby forming a plurality of alternating dense flux areas in said gap adjacent the spaces between said by-pass yokes and low density flux areas in said gap adjacent said by-pass yokes.

2. A machine as claimed in claim 1 wherein:
a plurality of magnetic flux circuits are provided; and
individual ones of said homopolar machines are arranged in respective magnetic circuits.

3. A machine as claimed in claim 2 wherein:
a plurality of individual conductive member parts are alternately disposed in said air gap between pole faces of respective magnetic field yokes.

4. A machine as claimed in claim 2 wherein:
a first one of said homopolar machines is provided in a first magnetic circuit and comprises a homopolar rotary direct current generator; and
a second one of said homopolar machines is provided in a second magnetic circuit and comprises an alternating current generator;
so that said machine is alternatively operable as a machine selected from the group consisting of a generator, a motor, a direct current to alternating current connector, and an alternating current to direct current connector.

* * * * *

UNITED STATES PATENT AND TRADEMARK OFFICE
CERTIFICATE OF CORRECTION

PATENT NO. : 5,068,561
DATED : November 26, 1991
INVENTOR(S) : Woo S. Lee

It is certified that error appears in the above-indentified patent and that said Letters Patent is hereby corrected as shown below:

column 4, line 48, delete "VT-V2+V4-V1-V3" and insert -- VT=V2+V4-V1-V3 --.

Signed and Sealed this

Twenty-ninth Day of June, 1993

Attest:

MICHAEL K. KIRK

Attesting Officer     Acting Commissioner of Patents and Trademarks